(12) United States Patent
Averill et al.

(10) Patent No.: US 7,467,260 B2
(45) Date of Patent: Dec. 16, 2008

(54) METHOD AND APPARATUS TO PURGE REMOTE NODE CACHE LINES TO SUPPORT HOT NODE REPLACE IN A COMPUTING SYSTEM

(75) Inventors: Duane Arlyn Averill, Rochester, MN (US); John Michael Borkenhagen, Rochester, MN (US); Philip Rogers Hillier, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 10/961,746

(22) Filed: Oct. 8, 2004

(65) Prior Publication Data
US 2006/0080509 A1 Apr. 13, 2006

(51) Int. Cl.
*G06F 12/00* (2006.01)
(52) U.S. Cl. ............ 711/128; 711/135; 711/133; 711/134
(58) Field of Classification Search ............ 711/128, 711/133, 144, 156, 159, 134, 135
See application file for complete search history.

(56) References Cited

U.S. PATENT DOCUMENTS

| | | | | |
|---|---|---|---|---|
| 4,519,001 A | * | 5/1985 | Morrison | 386/2 |
| 4,920,477 A | * | 4/1990 | Colwell et al. | 711/207 |
| 4,928,239 A | * | 5/1990 | Baum et al. | 711/136 |
| 5,568,632 A | * | 10/1996 | Nelson | 711/133 |
| 5,875,465 A | * | 2/1999 | Kilpatrick et al. | 711/134 |
| 6,076,142 A | * | 6/2000 | Corrington et al. | 711/114 |
| 6,397,298 B1 | * | 5/2002 | Arimilli et al. | 711/133 |
| 6,405,287 B1 | * | 6/2002 | Lesartre | 711/128 |
| 2002/0065992 A1 | * | 5/2002 | Chauvel et al. | 711/141 |
| 2002/0087799 A1 | * | 7/2002 | Faraboschi et al. | 711/135 |
| 2002/0194440 A1 | * | 12/2002 | Ghosh et al. | 711/156 |
| 2004/0019740 A1 | * | 1/2004 | Nakayama et al. | 711/113 |

OTHER PUBLICATIONS

Jim Handy; The Cache Memory Book; 1998; Academic Press; 2nd Edition; pp. 51-63.*
Smit Sinha, Anantha Chandrakasan; Dynamic Power Management in Wireless Sensor Networks; 2001; IEEE; pp. 62-74.*
Smit Sinha, Nathan Ickes, Anantha Chandrakasan; Instruction Level and Operating System Profiling for Energy Exposed Software; 2003; IEEE; pp. 1044-1057.*

* cited by examiner

*Primary Examiner*—Reginald G. Bragdon
*Assistant Examiner*—Victor W Wang
(74) *Attorney, Agent, or Firm*—Robert R. Williams

(57) ABSTRACT

An apparatus and method is disclosed for flushing a cache in a computing system. In a multinode computing system a cache in a first node may contain modified data in an address space of a second node. The cache in the first node must be purged prior to shutting down the first node. The computing system uses a random class replacement scheme for the cache. A cache flush routine sets a cache flush mode in a class replace select mechanism, overriding the random class replacement scheme. With the random class replacement scheme overridden, a minimum number of fetches will flush all the cache lines in the cache, each fetch loading the cache with a cache line not already in the cache. No additional delay penalty is incurred in a critical path through which fetches and stores to the cache must pass.

8 Claims, 8 Drawing Sheets

METHOD AND APPARATUS TO PURGE REMOTE NODE CACHE LINES TO SUPPORT HOT NODE REPLACE IN A COMPUTING SYSTEM

BACKGROUND OF THE INVENTION

1. Field of the Invention

The current invention generally relates to computing systems. More specifically, the present invention relates to flushing (purging) a cache memory in a processor node. The current invention can be used advantageously to flush a cache memory in a processor node prior to removing the node from a computing system.

2. Description of the Related Art

Early computing systems began as single processor systems, with the single processors using a single level of memory. The memory was typically magnetic cores in the 1960s, for example, and was very expensive. There was no "memory hierarchy", other than the single level of memory, and, of course, punch cards, disks, tapes, and the like.

As memory evolved, a range of price/performance memory options became available, leading to use of cache memories in the 1960s. The processor often had to wait for data from the memory system, and use of cache memories reduced the average wait for data by keeping recently used data in faster but more expensive memory. For example, fetching data from a cache memory might take ten processor cycles whereas fetching data from a higher level memory might take 100 processor cycles.

Modern computing systems can have many levels of cache in a memory hierarchy. For example, Levels 1-4, with Level 5 (L5) being what is often called "main memory", that is, the largest capacity memory (and the slowest, typically) in the computing system that is directly addressable by the processor. In the example, level 1(L1) is the lowest level in the memory hierarchy, Level 2 (L2) is higher than L1, and so on. Some modern processor chips contain three levels of cache (L1, L2, and L3) on the processor chip itself. Furthermore, large computing systems are made up of multiple nodes, each node having one or more processors.

A particular level of cache can hold a relatively small amount of data, compared to higher level caches, or main memory. When a processor requests data (a first cache line) that is not in the particular level of cache, the first cache line must be retrieved from a higher level in the memory hierarchy and written into the particular level of cache. A second cache line already in the particular level of cache must be replaced by the first cache line. If the second cache line contains the most recently updated version of the contents of the second cache line, the second cache line must be written to a higher level in the memory hierarchy before the first cache line can be written into the particular level of cache. It will be understood that modern computer systems often implement a castout buffer to hold evicted cache lines. That is, an evicted cache line can be written to the castout buffer rather than physically to the higher level in the memory hierarchy. The first cache line can be written into the particular level of cache after the second cache line has been written to the castout buffer in such a computer system. If the second cache line contains unmodified data, the first cache line can simply be written, replacing the second cache line. The cache management system must keep track of when cache lines are modified.

Modern cache designs incorporate associativity into caches. An associative cache divides a cache array into a number of sets (e.g., sets zero to N), each set having a number of classes (e.g., classes zero to three). A particular cache line fetched by a particular address, in the example of a four way associative cache, will be cached in only one set, but can be cached in any one of the four classes within the set. The cache controller must determine which one of the four (in the example) classes is to be replaced when a new cache line is to be written into the cache. Several schemes have been used for this purpose. A simple scheme is a round robin replacement. That is, for a given set in a four way associative cache, classes zero, one, two, three are replaced in that order, with class zero again being replaced after class three has been replaced. A second scheme is a LRU (Least Recently Used) algorithm. LRU replaces the class in an addressed set that was referenced longest ago, expecting that classes that have been recently used will be more likely to be used again. A third scheme is random replacement, where classes are picked "at random" (actually pseudo random, since a random pattern generator implemented on the chip will eventually repeat the patterns used in picking the class). Random replacement is commonly used on large caches in modern computing systems.

Modern large computing systems are constructed with more than one node, each node having one or more processors. Each node also contains a portion of the total main memory of the computing system. For example, if a computing system has four nodes and a total main memory of 256 GB (gigabytes), each node may have a 64 GB addressing range assigned to it, and have 64 GB of main memory built on the node. It will be understood that various computer manufacturers may use the term "cell" rather than "node". The present invention is not limited to NUMA (Non Uniform Memory Access) and is equally suitable to SMP (Symmetric Multiprocessor) architectures. A cache on a first node is likely to contain one or more cache lines that are in an address space assigned to a second node. For example, a processor owning an address range of the first 64 GB of total computing system address space fetches and modifies data that is in the 64 GB address range of the second node. One or more cache lines are sent from the second node to the first node and cached there, and perhaps modified by the first node in the course of processing. A desirable feature of large computing systems is that a particular node can be removed while other nodes remain operational. Prior to removing the particular node, modified cache lines must be flushed (purged) from the particular node and returned to the node owning the address of the modified cache lines.

Although flushing a cache, in principle, is easy to do, actual implementation can be difficult. For example, an address mechanism in the cache controller associated with the cache could simply "walk through" the addresses of the cache, including the class selection. However, one or more logic blocks would have to be added to the addressing mechanism, which is typically not acceptable, since cache access is often a critical path which determines the clock frequency at which the processor can be run. In simple "round robin" replacement schemes, a sufficient number of addresses known to map to a set (and not currently in the set) can be fetched. For example, if a cache is four way associative, having four classes in each set, and the replacement algorithm is "round robin", four addresses mapped to the set will suffice to flush the set. Cache lines addressed by these four addresses must not already be in the cache. Similarly, with an LRU replacement algorithm in the example, a set can be flushed with four fetches using suitable addresses that map to the set, because, upon replacement, a particular class in the set will become the "most" recently used. A second such fetch will replace the currently least recently used class, and so on, until the fourth (in the example) fetch will complete the flushing of the set.

Cache lines addressed by these suitable addresses must not already be in the cache. A problem arises, however, when the commonly used random replacement scheme is used. Depending on how many bits are used in the random pattern generator, which determines how often patterns repeat, a very large number of fetches might have to be performed to guarantee that all classes in a set have been flushed.

Therefore, there is a need for a method and apparatus that allow flushing of a cache in a node in a multinode computing system where the class replacement scheme is a random replacement scheme. In particular, no delay penalty should be paid for the normal address mechanism.

SUMMARY OF THE INVENTION

The current invention teaches methods and apparatus that provide for efficient flushing of a cache in a node in a multinode computing system where the class replacement scheme is a random replacement scheme. No additional logic blocks with their attendant delays are inserted into the normal address mechanism used to fetch or store for the cache. A cache flush of a node in a multinode computing system is required prior to powering down a node. The node may need to be powered down for repair, capacity on demand, or other reasons.

In a method embodiment, when the cache needs to be flushed, a class replace select mechanism is switched to a cache flush mode. A set in the cache is selected for flushing. A step is performed to ensure that cache lines in an address range used to flush classes in the set are not in the cache. A cache line read is made for each class in the set, with the random replacement scheme overridden by the cache flush mode, so that each class is activated in turn by the class replace select mechanism, and fetches are performed with suitable addresses, causing normal cache replacement to flush each class. Thus, each set, in turn, is flushed. In an alternative embodiment, while in the cache flush mode, the cache replace select mechanism activates a first class while fetches are made that will, in turn, cause the first class to be flushed in each set. When a particular set is flushed, the cache replace select mechanism activates a second class, and the process is repeated. When all elements of all classes have been flushed, the cache has been flushed, and the node may safely be taken offline and replaced, or simply powered down.

In a hardware embodiment of a multinode computing system having a random replacement scheme in a cache replace mechanism, a class replace select mechanism has a cache flush mode. When the cache flush mode is active, the random replacement scheme is overridden by a scheme that determines which class will be selected for replacement without using the random replacement scheme. In an embodiment, the operating system writes into a register, one or more latches, or other storage in the class replace select mechanism, information used to specify which class to select for replacement. In an alternative embodiment, a counter in the cache replace select mechanism, rather than the random replacement scheme, is used to select which cache class will be selected for replacement.

DETAILED DESCRIPTION OF THE PREFERRED EMBODIMENTS

The invention will be described in detail with reference to the figures. It will be appreciated that this description and these figures are for illustrative purposes only, and are not intended to limit the scope of the invention. In particular, various descriptions and illustrations of the applicability, use, and advantages of the invention are exemplary only, and do not define the scope of the invention. Accordingly, all questions of scope must be resolved only from claims set forth elsewhere in this disclosure.

The current invention teaches a method and apparatus to provide for efficient flushing of a cache where the class replacement scheme is a random replacement scheme. No additional logic blocks with their attendant delays are inserted into the normal address mechanism used to fetch or store for the cache.

The description hereinafter focuses on flushing a cache in a node of a multinode system, which is required prior to powering down the node (for repair, support of on demand computing, or other reasons); however, the method and apparatus are suitable for flushing a cache in a single node system as well.

Figure 1:
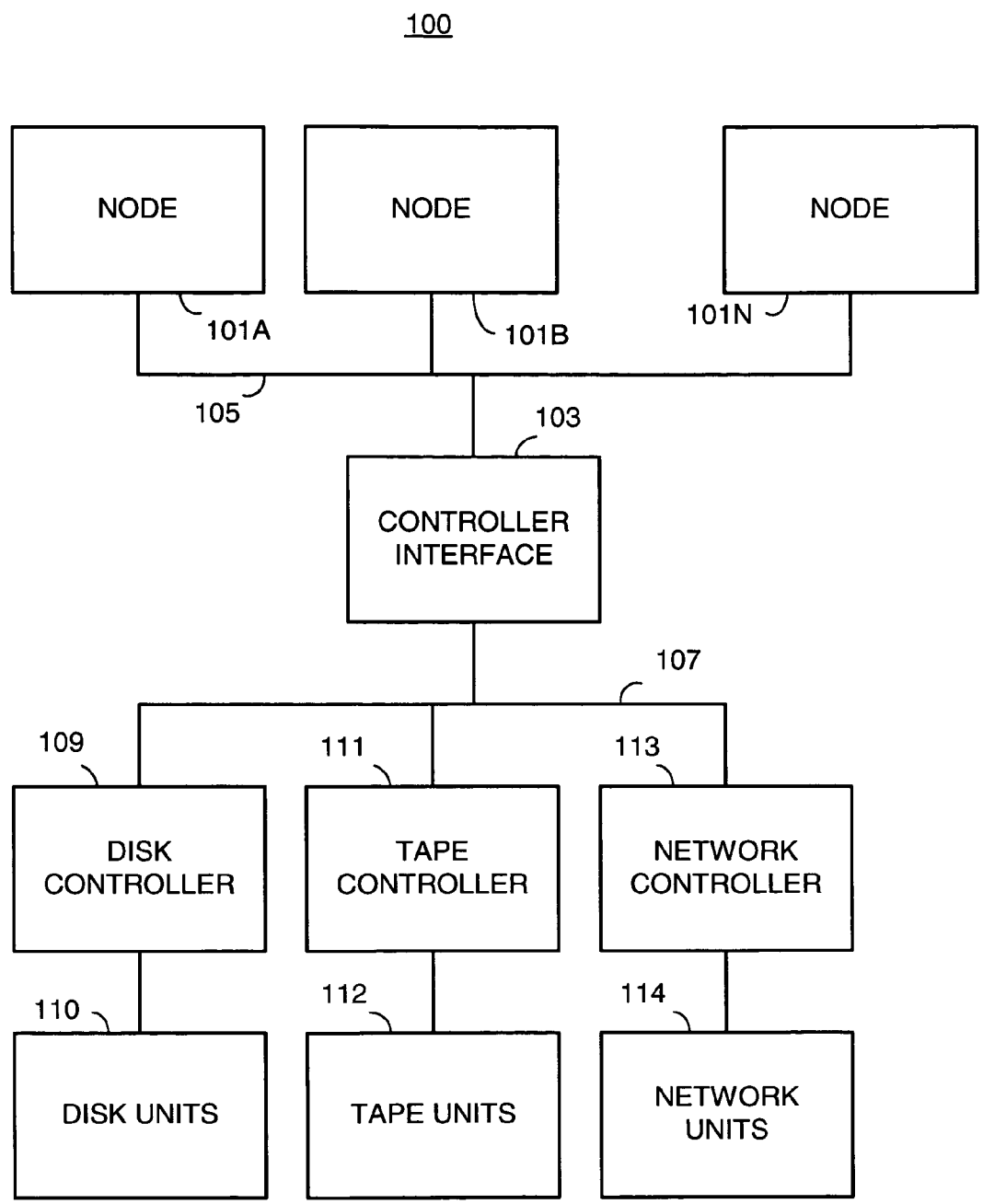
FIG. 1 is a block diagram of a computing system suitable for implementing the present invention.

Having reference now to the drawings, FIG. 1 illustrates a computing system 100 suitable for benefiting from embodiments of the present invention. Computing system 100 includes a plurality of nodes; nodes 101A-101N. There may be only two nodes in computing system 100, or there may be a large number of nodes, such as 256 nodes. Any number of nodes two or greater is contemplated by the invention. In general hereinafter, a node will be simply called node 101 unless a specific node must be identified. Nodes 101A-101N are coupled together by a bus 105. It is understood that there are many ways to couple nodes in a computing system, including networks of multiple busses, switches, buffers, and the like. The present invention contemplates any means of coupling nodes in a computing system. Bus 105 is further coupled to controller interface 103, which serves as an interface between the nodes 101A-101N and various I/O facilities. It is understood that modern computer systems have any number of ways to construct such an interface, and the simple block 103 is not meant to be limiting. Controller interface 103 is coupled to disk controller 109, tape controller 111, and network controller 113 via bus 107. As before with bus 105, bus 107 is only one way to couple controller interface 103 to disk controller 109, tape controller 111, and network controller 113. Disk controller 109 is further coupled to one or more hard disks units 110. Tape controller 111 is further coupled to one or more magnetic tape units 112. Network controller 113 is further coupled to one or more network units 114. Network units 114 can include but are not limited to modems; local area networks, and wide area networks.

Figure 2A:
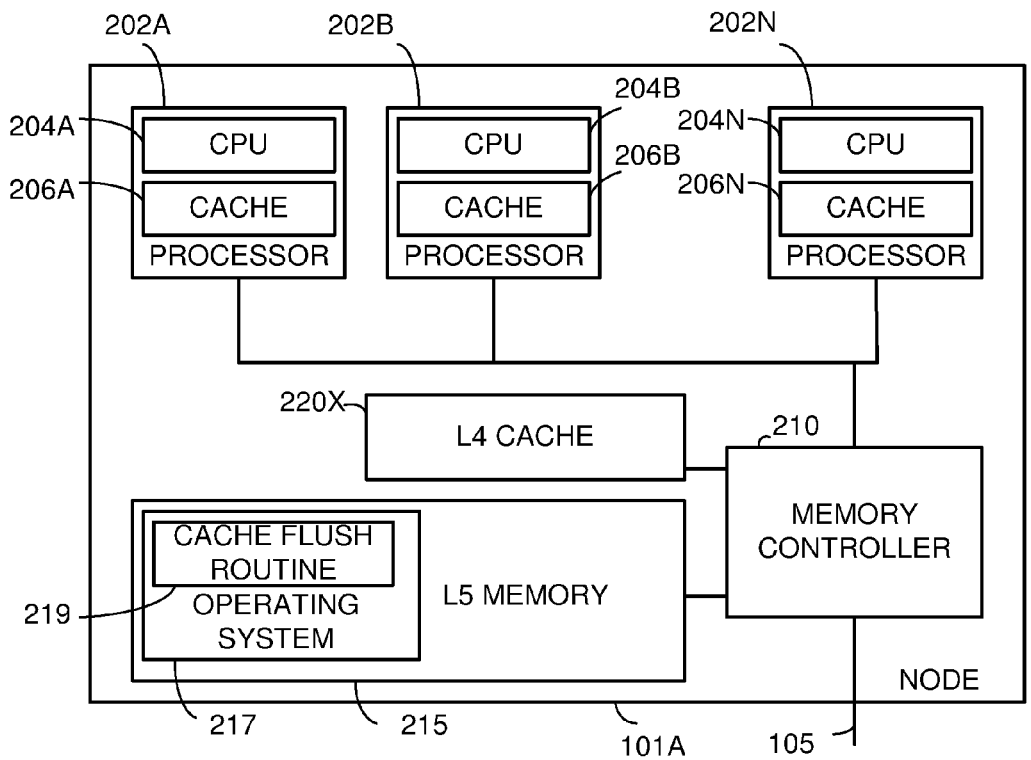
FIGS. 2A and 2B are block diagrams of exemplary nodes in the computing system of FIG. 1.
Figure 2B:
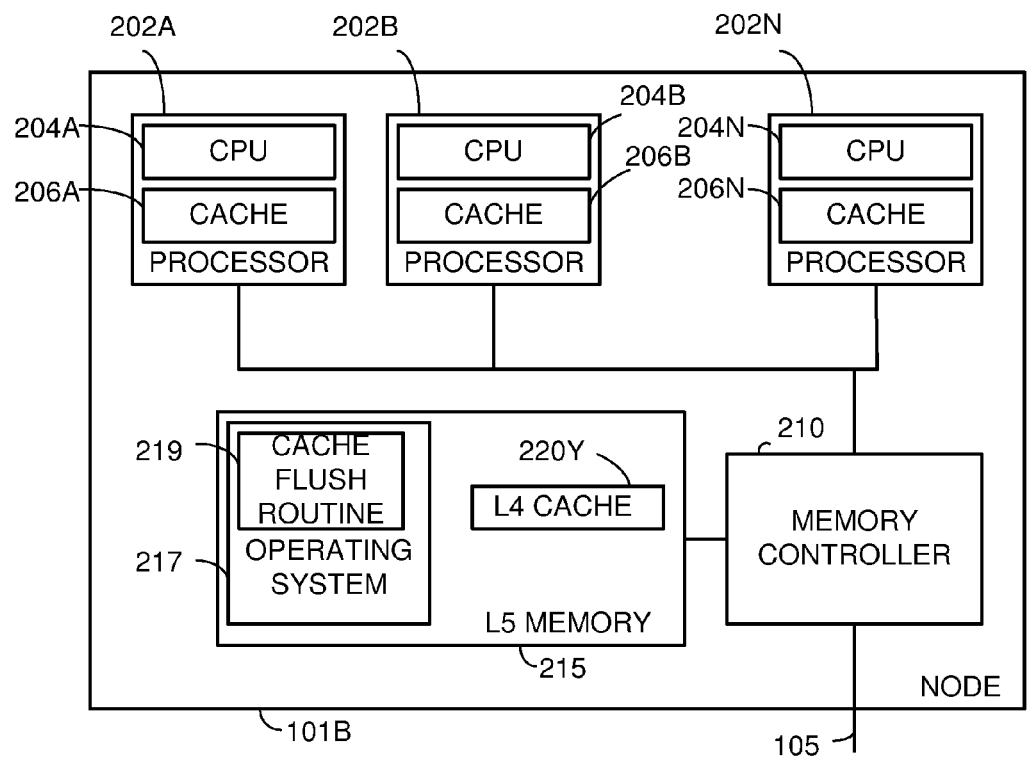

FIGS. 2A and 2B illustrate two slightly different embodiments of a node 101. As will be described below, the only difference lies in the incorporation of an L4 cache into the L5 memory of node 101 shown in FIG. 2B.

In FIG. 2A, node 101A is shown to include a number of processors 202A-202N. Typically, a node 101 has from one to four processors, but any number of processors on a node 101 is within the spirit and scope of the present invention. Processors 202A-202N further include CPU (central processing unit) 204A-204N, respectively. Processors 202A-202N also further include caches 206A-206N, respectively. In general hereinafter, unless a particular processor must be identified, the term processor 202 will be understood to be a generic processor in a node 101. Similarly, the terms CPU 204 and cache 206 will be understood to be a generic CPU and a generic cache, respectively, on a processor. It will further be understood that cache 206 may be a hierarchy of caches on a chip. For example a modern processor 202 may contain three levels of cache (called L1, L2, and L3 caches) internal to a semiconductor chip containing processor 202.

Processors 202A-202N are coupled to a memory controller 210. Memory controller 210 is further coupled to bus 105 which couples nodes 101A-101N and controller interface 103 as described earlier. Memory controller 210 is coupled to L5 memory 215. L5 memory 215 on a particular node is what is often called "main memory". L5 memory 215 is typically a relatively large amount of memory, such as 64 GB on modern systems today. The size (i.e., GB) of L5 memory 215 is in an address space portion of the entire computing system address space that is assigned to a particular node. For example, if L5 memory 215 on node 101A is 64 GB, node 101A "owns" that 64 GB of memory. Processors 202 can access memory in other nodes (e.g., processors 202 on node 101A can get data (cache lines) from node 101B) but must get such those cache lines via bus 105. L5 memory 215 contains operating system 217, which further contains a cache flush routine 219, which will be described later.

Memory controller 210 further is coupled to L4 cache 220X. Consider now, for purposes of explanation, an L4 cache 220X on node 101A. L4 cache 220X is used to cache data from L5 memory 215 on the same node (e.g., node 101A) that is used by processors 202 on node 101A. L4 cache 220X also is used to cache data from other nodes. For example, L4 cache 220X on node 101A might contain a particular cache line being used by processor 202B on node 101A, but the particular cache line is in an address space of a different node, e.g., node 101B. Furthermore, processor 202B on node 101A might have modified the contents of the cache line, in which case, node 101B does not have the most recent version of the cache line. Since the data belongs to an address space owned by node 101B, the data must be flushed from L4 cache 220X on node 101A back to an L5 memory in node 101B via bus 105 before node 101A can be powered down. FIG. 2B shows a node 101B having a slightly different embodiment of the L4 cache. In FIG. 2B, an L4 cache 220Y is physically embodied as a portion of L5 memory 215, whereas in node 101A, L4 cache 220X is a physically different memory, perhaps using a different memory technology than L5 memory 215. L4 cache 220X also has separate address and data paths coupling L4 cache 220X to memory controller 210 than the address and data paths coupling L5 memory 215 to memory controller 210. Other referenced items in node 101B operate as described in the discussion of node 101A. In fact, there are many ways to physically construct the levels of memory in a node, and the present invention is not limited to any particular implementation of the levels of memory.

Figure 3:
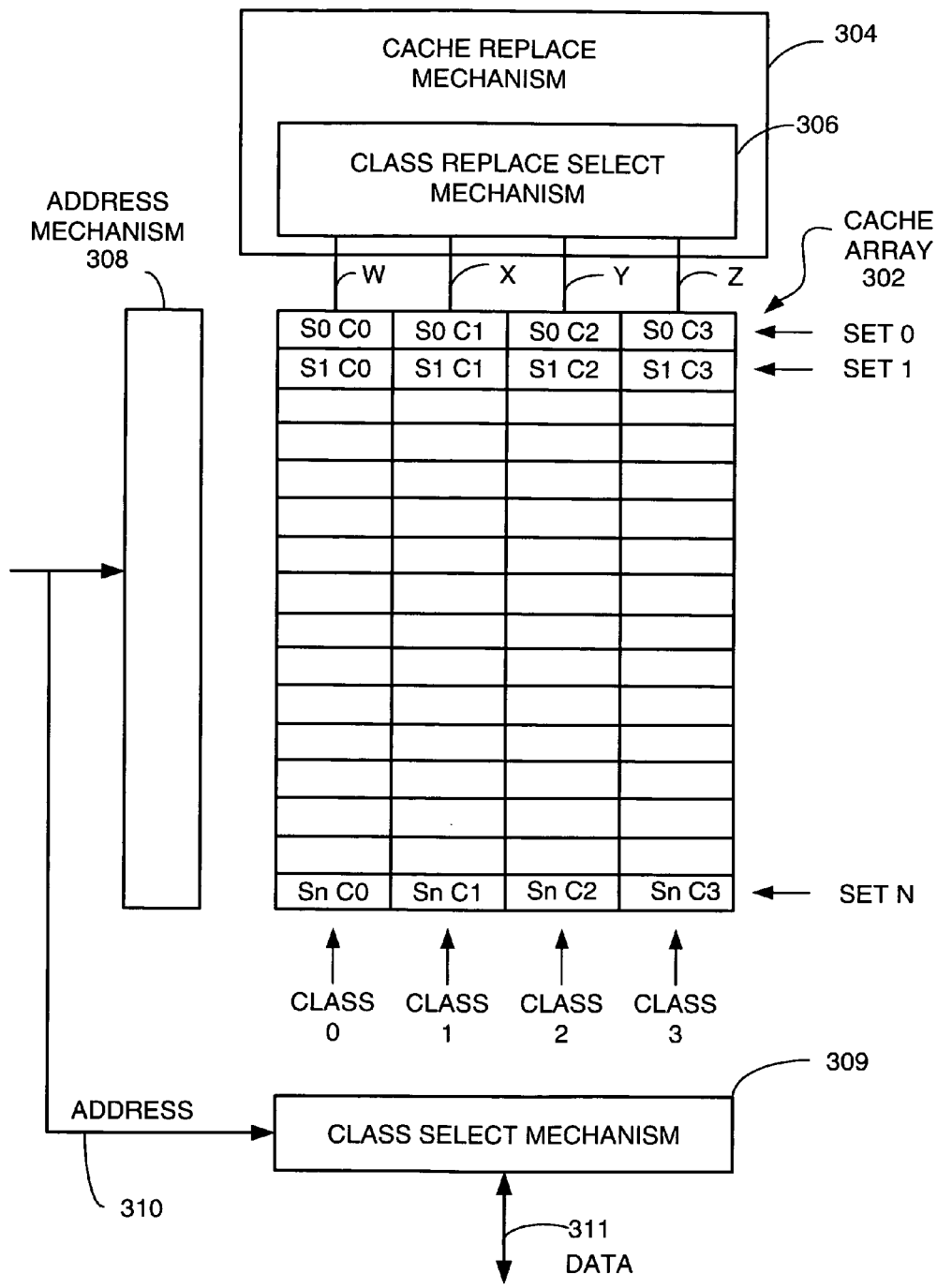
FIG. 3 is a block diagram of a cache, showing a class replace select mechanism as described in embodiments of the present invention.

FIG. 3 illustrates an embodiment of an L4 cache 220. L4 cache 220 could be used for either L4 cache 220X or L4 cache 220Y of FIG. 2A, 2B. A cache at any level in the memory hierarchy must have a cache replace mechanism, such as cache replace mechanism 304. As described earlier, a cache has a relatively small storage capacity compared to higher levels of a storage hierarchy. For example, an L1 cache might have 8 KB (kilobytes) of storage; an L2 cache might have 64 KB of storage; an L3 cache might have 512 KB of storage; an L4 might have 64 MB (megabytes) of storage. A cache line from any of the cache lines in the total addressing space of the computing system must be able, at a given point in time, to be stored in any level cache. Therefore, when a first cache line is fetched into a particular cache, it must replace a second cache line already stored in the particular cache. If the second cache line contains the most recently updated version of the second cache line, the second cache line must be written to a higher level in the memory hierarchy prior to being replaced by the first cache line. Cache replace mechanism 304 performs the function of determining if the second cache line must be written before replacement.

Many modern caches are associative. That is, the first cache line described above can be stored in any one of a plurality of classes in a set. FIG. 3 shows an exemplary four-way associative cache 220. Cache array 302 is divided into sets 0 through N. Each set has four classes, class 0 through class 3. When the first cache line is addressed, it can be written into class 0, class 1, class 2, or class 3 of a set that is determined by a portion of the address of the first cache line. Positions for cache lines in cache array 302 are indicated by the set and class. For example, set 0 has four positions for cache lines, "S0 C0" (set 0, class 0); "S0 C1" (set 0, class 1); "S0 C2 " (set 0, class 2); and "S0 C3" (set 0, class 3). Each position for cache lines contains the cache line. In some implementations, a tag address is also stored, although the tag address is usually stored separately in a directory array. Address mechanism 308 receives addresses on address line 310 and determines in which set a particular cache line must be stored. Class select mechanism 309 examines tags and addresses to determine in which class a particular cache line is stored within the set determined by the address of the first cache line. Data is received by class select mechanism 309 on data bus 311 and routed to a selected class in cache array 302 for writes. For reads, class select mechanism 309 selects data from the correct class and routes it to data bus 311.

When a second cache line is to be replaced, a class replace select mechanism 306 must determine which of the plurality of classes within a set is to be evicted (written over if not containing the most recently modified version of the cache line; copied to a higher level of the memory hierarchy and then written over if containing the most recently modified version of the cache line). A logical path through address mechanism 308 and class select mechanism 309 that determines which class a particular cache line is stored within the set is typically a "critical path" that determines a cycle time of the computing system. Insertion of additional delay blocks in the logical path is typically unacceptable.

Cache replace mechanism 304 contains (or is suitably coupled to) the class replace select mechanism 306. Various schemes have been developed for class replace select mechanism 306. Class replace select mechanism 306 produces signals W, X, Y, Z which determine (in the exemplary four way associative cache being used for explanation) which class will be evicted when eviction is necessary. For example, a simple round robin scheme has been used. The round robin scheme simply starts with a class (e.g., class 0), and simply moves on to the next class each time a cache line must be evicted. Thus, class 0, class 1, class 2, class 3 are, in turn, evicted, with class 0 again being evicted after an eviction of class 3. An LRU (Least Recently Used) scheme has been used in some computing systems. In the LRU scheme, some information is kept that indicates which class of the classes within a set was the least recently used. The idea with an LRU algorithm is that if a cache line has been used less recently than others it is likely to not be used in the near future, and therefore is a good choice for eviction. Unfortunately, with modern multilevel caches, a cache line that is least recently used in, for example, an L4 cache (e.g., L4 cache 220) may be least recently used by the L4 cache because a lower level cache has been using the cache line extensively but has not written its contents to the L4 cache. Eviction of that particular cache line from the L4 cache would entail eviction of the cache line from the lower level cache as well, which would not be the best choice in this exemplary situation. A popular scheme used in class replace select mechanism 306 is a random replacement scheme, in which classes are randomly (pseudo randomly, as described earlier) chosen within a set for eviction. Other class replacement schemes are known that appear random, and, in which, determination of which class, in a plurality of classes, will be replaced at a given time, is difficult. These will also hereinafter be considered to be a random replacement scheme.

Figure 4:
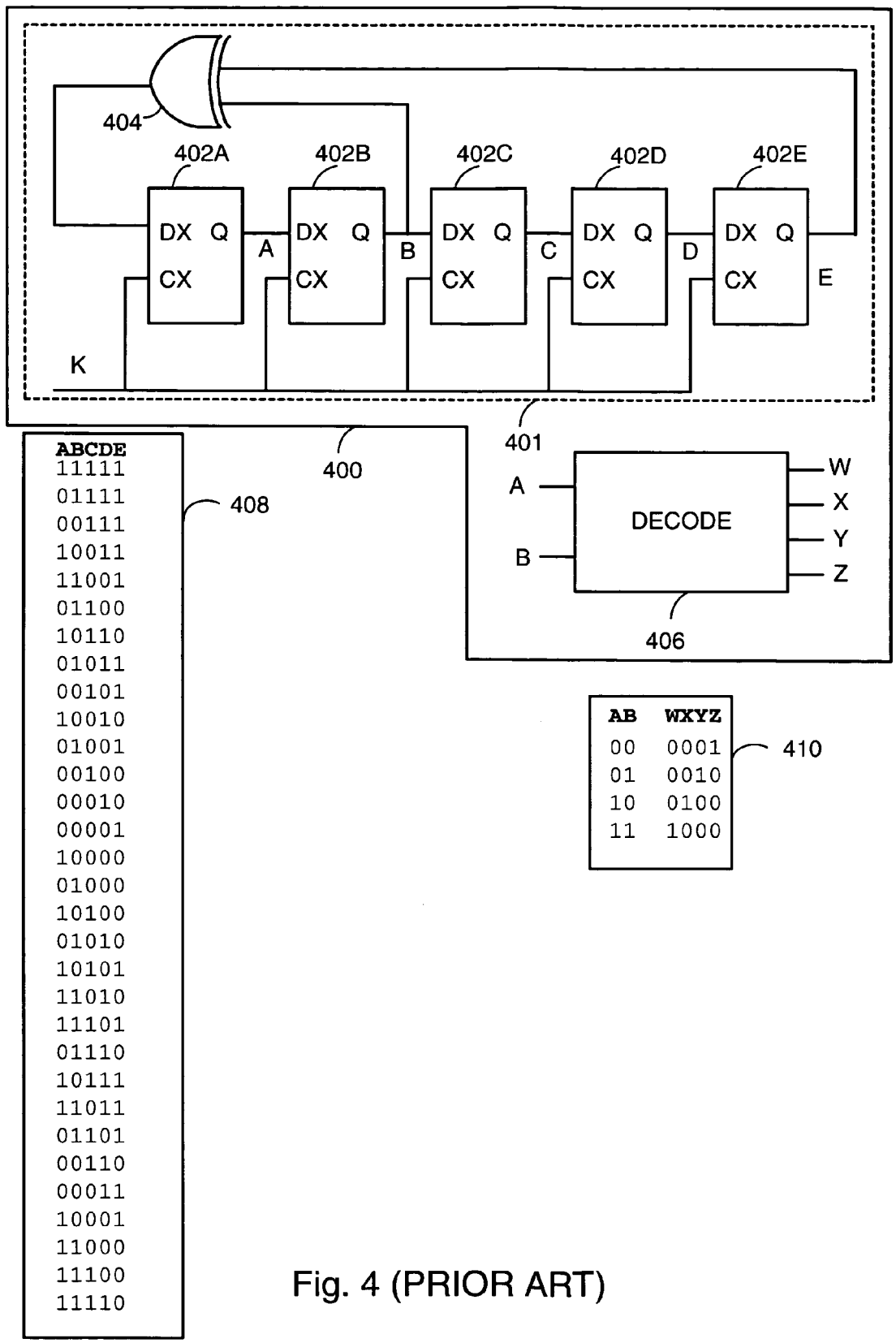
FIG. 4 is a prior art diagram of a random class replace select mechanism.

FIG. 4 shows a typical prior art random replacement scheme implementation 400 comprising a random pattern generator 401 and a decoder 406. Latches 402A, 402B, 402C, 402D, and 402E each have a data input DX, a clock input CX, and an output Q. Nodes A, B, C, D, and E are driven by outputs Q of latches 402A, 402B, 402C, 402D, and 402E respectively. Exclusive OR 404 receives nodes B and E and produces an output coupled to data input DX of latch 402A. Each time clock K switches, the five-bit value comprising the logical signals on nodes A, B, C, D, and E changes, repeating after 31 clocks. The bit pattern of the five-bit value appears to be random (but is in reality pseudo-random) as shown in table 408. Decode 406 is coupled to nodes A and B as inputs and produces W, X, Y, Z (see FIG. 3) as output. Decode 406 implements the truth table shown in table 410, i.e., a 2-4 decoder.

Note that in the prior art random replacement scheme, there is uncertainty as to how many clocks to apply to guarantee that a particular class is selected (by W, X, Y, or Z) for eviction. If more latches are used in the random replacement scheme implementation (so that the patterns repeat less frequently), even more uncertainty is added. This uncertainty (randomness) is, of course, the object of the random class replacement scheme.

Cache flushing is usually done by fetching a set of cache lines having addresses that map to each set in the cache. That is, using the exemplary cache array 302 in FIG. 3, enough addresses mapping to set 0 must be fetched to guarantee that the contents of "S0 C0"; "S0 C1"; "S0 C2; and "S0 C3" are evicted. In addition, it must first be ensured that a cache line having one of such addresses is not already in the cache, since that cache line would not then be evicted, but, rather, simply stay in the cache.

The large degree of uncertainty in which cache line in a set will be evicted with the prior art random replacement scheme forces a large number of fetches to be required to guarantee that the cache is flushed. While modification of address mechanism 308 and class select mechanism 309 would avoid the problem, by simply writing cache lines to specific sets and classes, such modification would increase the delay of the critical path through address mechanism 308 and class select mechanism 309, which would slow down normal fetches and stores.

Figure 5A:
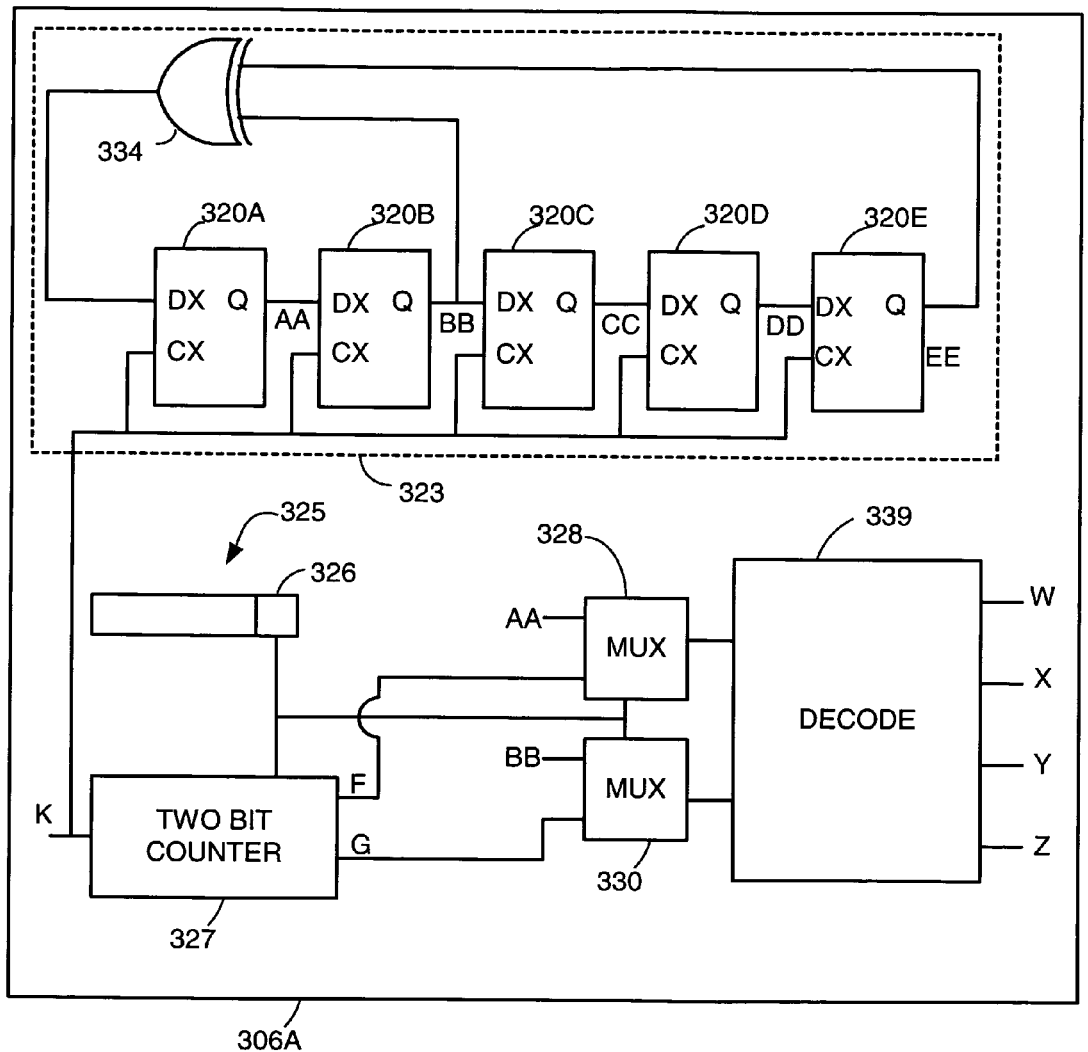
FIGS. 5A and 5B illustrate two embodiments of a class replace select mechanism as taught in the description below.

FIG. 5A illustrates a class replace select mechanism 306A embodiment of class replace select mechanism of FIG. 3 that removes uncertainty as to how many cache lines must be fetched to flush a cache (e.g., L4 Cache 220) without incurring a delay penalty in the critical path through address mechanism 308 and class select mechanism 309. A random pattern generator 323 (pseudo-random) comprises latches 320A, 320B, 320C, 320D, 320E, and an exclusive OR 334. Each latch has a data input DX, a clock input CX, and an output Q. Latch 320A drives node AA; latch 320B drives node BB; latch 320C drives node CC; latch 320D drives node DD; and latch 320E drives node EE. Nodes BB and EE are coupled to inputs of exclusive OR 334. An output of exclusive OR 334 is coupled to the data input of latch 320A. Random pattern generator 323 is similar to random pattern generator 401 of FIG. 4, and patterns are generated as shown in table 408 in FIG. 4. Class replace select mechanism 306A further comprises a decode 339 that is similar to decode 406 in FIG. 4 and implements a truth table as illustrated in table 410 in FIG. 4. Flush mode register 325 is written by cache flush routine 219 of operating system 217. When a flush of the cache, e.g., L4 cache 220, is required, cache flush routine 219 sets a flush mode flag 326 in flush mode register 325, indicating that a cache flush mode is active and that a cache flush is to be performed. Flush mode flag 326 is coupled to a two bit counter 327, enabling the counter to count responsive to clock K as shown. Two bit counter outputs signals F and G. Advantageously, two bit counter, on succeeding transitions of clock K, produces a simple binary count on signals F and G, e.g., F,G in turn become "0,0"; "0,1"; "1,0"; and "1,1". Multiplexers 328 and 330 are controlled by flush mode flag 326 to select either the appropriate nodes of random pattern generator 321 (i.e., AA and BB) or the outputs (F,G) of two bit counter 327. Therefore, when flush mode flag 326 is not active (e.g., "0"), signals W, X, Y, and Z select classes for replacement "randomly", but when flush mode flag 326 is active (e.g., "1"), signals W, X, Y, and Z are simply activated one after the other on subsequent transitions of clock K.

Figure 5B:
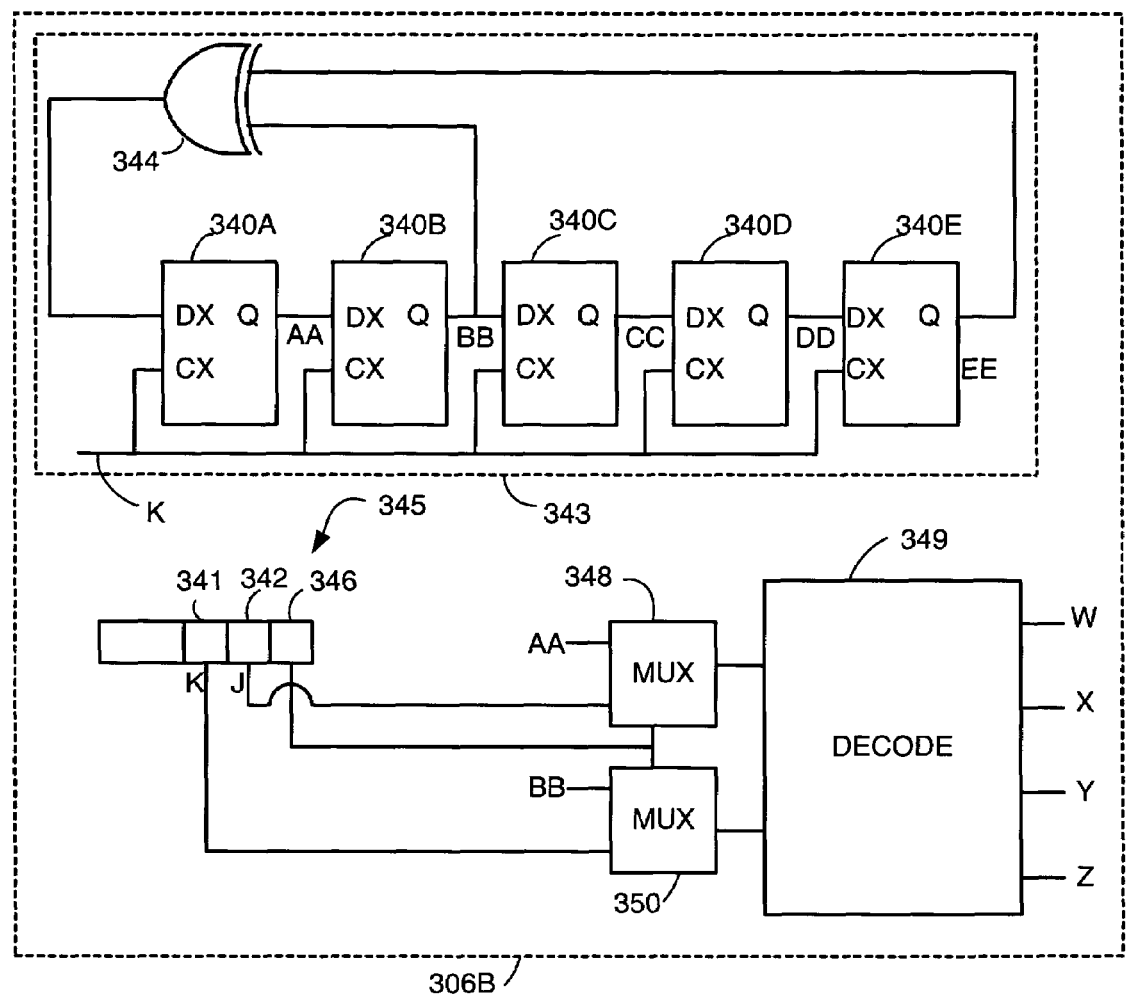

FIG. 5B illustrates cache replace select mechanism 306B, a second embodiment of cache replace select mechanism 306 (FIG. 3). Random pattern generator 343, comprising latches 340A, 340B, 340C, 340D, and 340E, and exclusive OR 344 provides outputs AA and BB in a manner similar to random pattern generator 321 of FIG. 5A. A flush mode register 345 includes flush mode flag 346, which indicates, like flush mode flag 326, when cache flush mode is active. Flush mode register 345 is written by cache flush routine 219 of operating system 217. Flush mode register data bits 341 and 342 are written by cache flush routine 219 to explicitly control which class is to be selected for replacement when flush mode flag 346 is active (i.e., "1"). For example, cache flush routine 219 can write "0,0" into flush mode register data bits 341, 342, and a "1" into flush mode flag 346 such that "class 0" will be selected for replacement. Flush mode flag 346 being active controls multiplexers 348, 350 to gate K, J (outputs of flush mode register bits 341, 342) to decode 349. When flush mode flag 346 is inactive ("0"), nodes AA, BB are gated to the inputs of decode 349, and signals W, X, Y, and Z are activated "randomly". When flush mode flag 346 is active ("1"), W, X, Y, and Z are activated according to the decode (decode 349) of flush mode register data bits 341, 342. Using cache replace select mechanism 306B, cache flush routine 219 has total control over which class is selected for replacement.

Cache flush routine 219, using either embodiment of cache replace select mechanism 306, or other variations of cache replace select mechanism 306 that, in a cache flush mode, provide deterministic control of signals W, X, Y, and Z. Cache flush routine 219 must fetch each of a set of addresses suitable for causing evictions (i.e., mapping to each set in the cache). Prior to fetches using each address in the set of addresses, Cache flush routine 219 must ensure that the cache lines associated with the addresses in the set of addresses are not already in the cache. Typical computer systems provide means for flushing a particular cache line. For example, IBM Corporation's PowerPC™ architecture provides a "DATA CACHE FLUSH(addr)" instruction that causes a flush of a cache line containing the specified address (i.e., "addr"). For a second example, the Intel IA32™ architecture provides a "CFLUSH m8" instruction that flushes a cache line containing address m8. "Containing" here means that the cache line contains data addressed by the associated address, not that the address itself is data in the cache line. If a particular computer architecture does not include an instruction such as "DATA CACHE FLUSH(addr)" or "CFLUSH m8", alternatively, an equivalent function can be performed by having other nodes in the computer system acquire the cache lines containing the specified addresses.

Figure 6A:
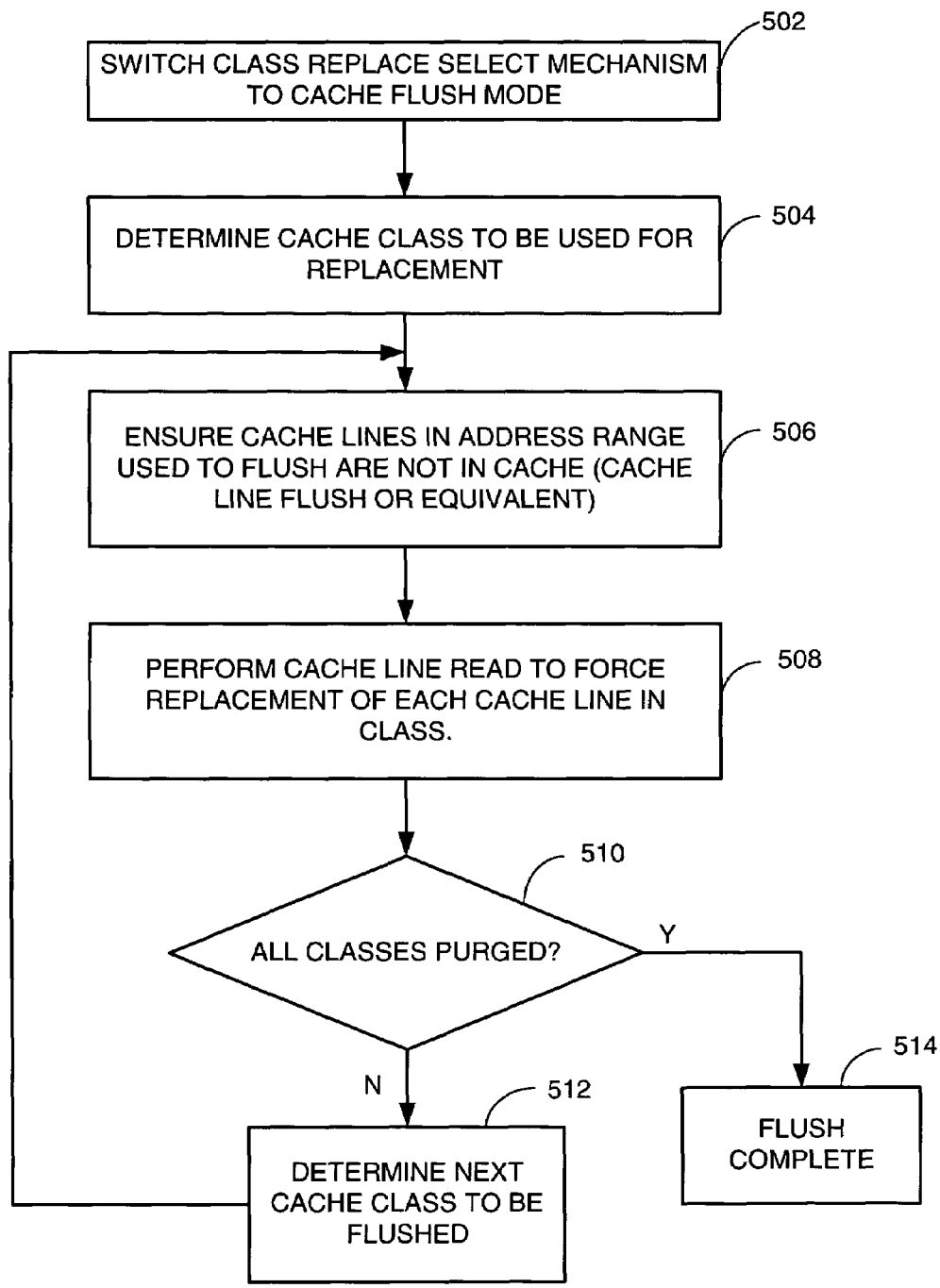
FIGS. 6A and 6B are flow charts that illustrate steps taken in method embodiments of the present invention.
Figure 6B:
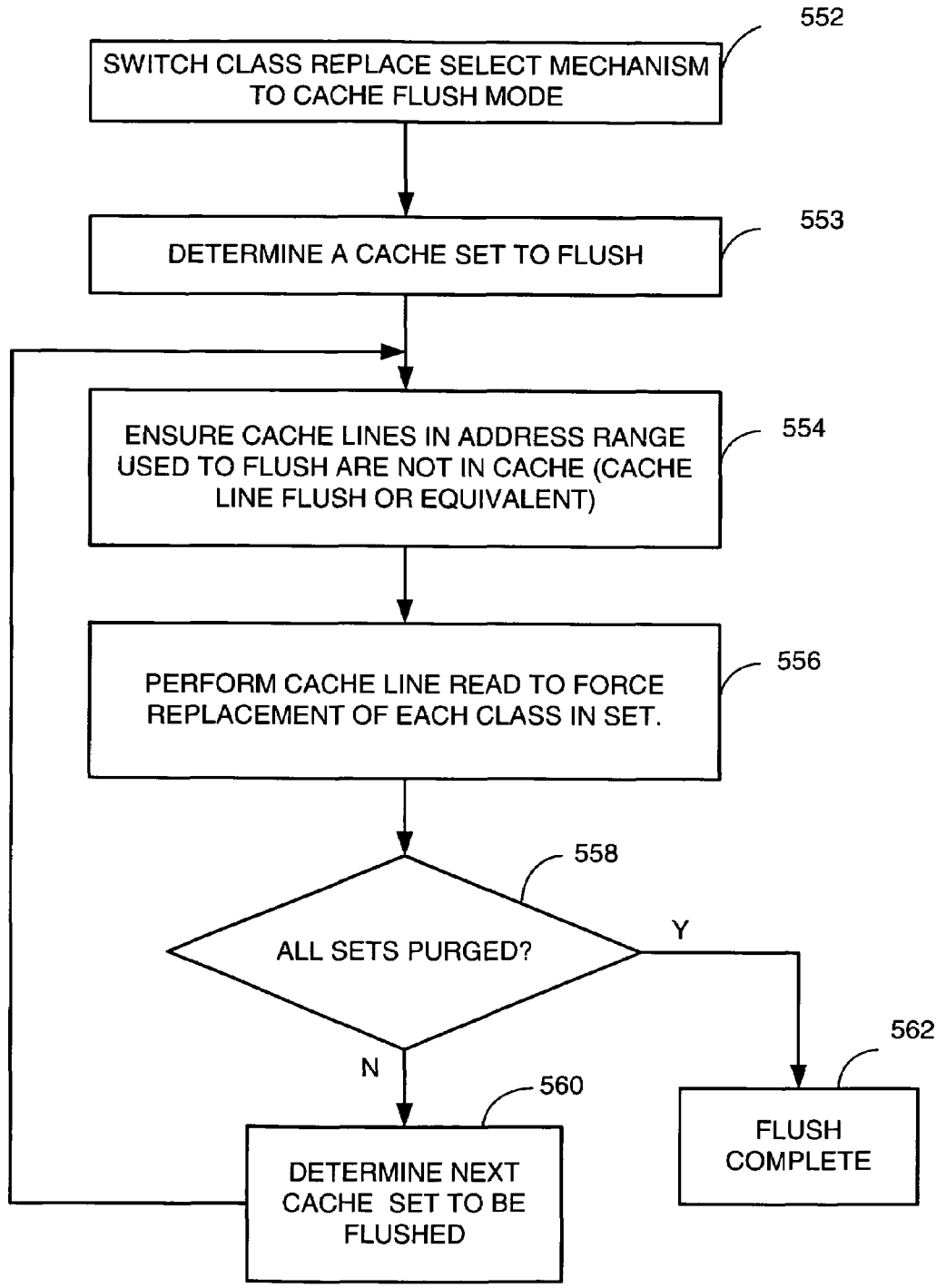

FIGS. 6A and 6B illustrate method embodiments for flushing a cache. Advantageously, the methods are performed by a program product run on a suitable processor, e.g., cache flush routine 219 executing on a processor 202 as shown in FIGS. 2A and 2B. The program product containing cache flush routine 219 can be provided on computer readable media such as, but not limited to, a CDROM, a DVD disk, a magnetic tape, a floppy disk. The program product containing cache flush routine 219 can be provided over a network such as a LAN (Local Area Network) or other network such as the internet.

Method 500, illustrated in FIG. 6A shows a first method embodiment of the invention, and discussion will refer to the apparatus shown in FIG. 5B. In step 502, the class replace select mechanism is switched to a cache flush mode. Associated apparatus was illustrated and described earlier, in which cache flush routine 219 sets a flush mode flag (flush mode flag 346 in FIG. 5B). As explained earlier, when in the cache flush mode, the random replacement scheme used in the class replace select mechanism is overridden and a deterministic scheme is used instead.

In step 504, the deterministic scheme is set to select a particular class for replacement in a plurality of classes in an associative cache. For example, if a cache is four-way associative, step 504 may choose to start with "class 0". In the apparatus of FIG. 5B, starting with "class 0" is done by cache flush routine 219 writing "0,0" into flush mode register bits 341, 342.

In step 506, the method ensures that cache lines in addresses used to flush cache lines are not already in the cache. If a cache line addressed by a particular address is already in the cache, an eviction would not occur. Therefore, the method must ensure that such cache lines are not already in the cache. As described earlier, computer architectures supply instructions to flush cache lines containing specific addresses. All addresses in a set of flush addresses are presented with the instructions to flush cache lines containing specific addresses, ensuring that cache lines containing these addresses are not already in the cache.

In step 508, a cache line read (fetch) is made, using addresses in the set of flush addresses, to force replacement of each cache line in the class currently selected for replacement by the cache replace select mechanism. For example, if the current class is "class 0", and there are 512 sets in the cache, then 512 reads are made, using appropriate addresses, one address from the set of flush addresses for each set, to force replacement of a cache line in the cache. Normal logic used in the cache replace mechanism (e.g., cache replace mechanism 304 of FIG. 3) performs the function of writing contents of the cache line to a higher level in the memory hierarchy if the cache contains the latest update of the cache line. In the L4 cache as depicted in FIGS. 2A, 2B, this action writes any updated cache lines back to their home nodes. For example, if a cache line addressed by an address in the address space of an L5 memory in node 101B (FIG. 1) is in an L4 cache in node 101A, and node 101A is performing a cache flush, that cache line, if modified, is copied from the L4 cache in node 101A to the L5 memory in node 101B.

Step 510 checks whether all classes in the cache have been flushed. If so, control passes to step 514, which completes method 500. The cache can safely be powered down, since all data has been written to a higher level in the memory hierarchy. If not, the cache flush routine in step 512 determines the next class to be flushed, and forces the cache replace select mechanism to that class. Control then passes back to step 506.

In the method just described, cache lines are evicted from a selected class while fetches are made to sets in the associative array. When a set is finished, another class is selected and the process is repeated. When all classes have been selected, the method is complete.

FIG. 6B illustrates a method 550 to flush a cache. Method 550 corresponds to the cache replace select mechanism 306A shown in FIG. 5A. Method 550 steps through classes in a set, replacing the cache line of each class in turn. Step 552 begins method 550 by switching the class replace select mechanism to a cache flush mode.

Step 553 determines a set to flush (all classes within the set will be flushed) and selects an address or addresses that will fetch into the determined set.

Step 554 ensures that cache lines in a set of addresses that will be used to fetch cache lines to evict cache lines in the cache do not address cache lines already in the cache, as explained earlier.

Step 556 performs cache line reads to force replacement of each class in a set. In the exemplary class replace select mechanism 306A, a two bit counter is used to step through each class in four way associative cache set. Different addresses which map to the currently selected set can be used to fetch data into each class in the set. Alternatively, the same address can be used; however, the class flush instruction described earlier would be used prior to each fetch to flush the cache line having the same address which was just fetched into the prior class selected.

Step 558 checks whether all sets have been flushed (purged). If all sets have been flushed, method 550 is complete, as shown in step 562. If all sets have not been flushed, control passes to step 560 which determines the next set to be flushed, selects an appropriate address (or set of addresses) to flush the newly determined set, and passes control to step 554.

What is claimed is:

1. A computer system comprising:
   a processor;
   an associative cache having N sets, each set having M classes, coupled to the processor, the cache further comprising:
      a cache replace mechanism having a deterministic replace scheme;
      an address mechanism;
      and
      a cache array;
   a main memory coupled to the processor;
   a cache flush routine residing, at least in part, in the main memory, the cache flush routine configured to activate a cache flush mode, the cache flush mode, when activated, configured to execute, once for each class in each set, a cache flush instruction that flushes a cache line having a particular address that maps to an instant set, the cache flush instruction ensuring that the cache line having the particular address does not exist in the instant set, the cache flush instruction being immediately followed by a fetch from the particular address, the fetch causing a replacement of a victim cache line in an instant class selected by the deterministic replace scheme.

2. The computer system of claim 1, the deterministic replace scheme configured to use a counter to select a particular class.

3. The computer system of claim 1, the deterministic replace scheme configured to use a data supplied by the cache flush routine to select a particular class.

4. A computer system comprising:
a plurality of nodes, each node further comprising:
  a processor;
  a main memory having an address space that is a portion of a total address space of the computer system;
  a cache flush routine residing, at least in part in the main memory, that is configured to activate a cache flush mode; and
  an associative cache having N sets, each set having M classes, further comprising:
   a cache array;
   an addressing mechanism; and
   a cache replace mechanism having a deterministic replacement scheme;
a coupling between the plurality of nodes suitable for transferring a cache line from a first node in the plurality of nodes to a second node in the plurality of nodes; and
an operating system capable of turning off the second node;
wherein the cache flush routine is further configured to execute, once for each class of each set; a cache flush instruction for a particular address that maps to an instant set, immediately followed by a fetch instruction using the particular address, the fetch causing a replacement of a victim cache line in an instant class selected by the deterministic replacement scheme.

5. The computer system of claim 4, wherein the cache flush routine in the second node activates the cache flush mode in the second node prior to the operating system turning off the second node.

6. The computer system of claim 5, wherein the cache flush routine in the second node flushes the cache in the second node prior to the operating system turning off the second node.

7. A method for flushing an associative cache having N sets, each set having M classes, the associative cache further having a deterministic replacement scheme in a computer system comprising the steps of:
for each class in each set in the associative cache performing the steps of:
  creating a particular address that maps to an instant set;
  using the deterministic replacement scheme to select a particular class;
  executing a cache flush instruction for the particular address that will flush a cache line having the particular address from the instant set; and
  immediately following executing the cache flush instruction, executing a fetch using the particular address, the fetch causing a replacement of a victim cache line in the particular class.

8. A computer-readable medium encoded with a computer program that, when run on a suitable computing system, executes the method of claim 7.

* * * * *